United States Patent [19]

Walker

[11] Patent Number: 4,529,876
[45] Date of Patent: Jul. 16, 1985

[54] INTEGRATED OPTICS TRANSDUCER

[76] Inventor: Clifford G. Walker, 915 Weatherly Rd., Huntsville, Ala. 35803

[21] Appl. No.: 566,065

[22] Filed: Dec. 27, 1983

[51] Int. Cl.³ .............................................. G02B 5/14
[52] U.S. Cl. ................................... 250/227; 356/350; 250/231 R
[58] Field of Search .................. 73/657, 800; 356/350; 250/227, 231 G, 231 R; 350/96.13, 96.14; 455/616, 610–612

[56] References Cited

U.S. PATENT DOCUMENTS

| | | | |
|---|---|---|---|
| 3,506,362 | 4/1970 | Doyle et al. | 356/111 |
| 3,517,560 | 6/1970 | Jacobs et al. | 73/516 |
| 3,800,594 | 4/1974 | Hutchings et al. | 73/516 R |
| 4,039,260 | 8/1977 | Redman | 356/106 |
| 4,155,251 | 5/1979 | Lautzenhiser | 73/141 A |
| 4,233,847 | 11/1980 | Walker | 73/517 R |
| 4,290,697 | 9/1981 | McLandrich | 356/350 |
| 4,429,997 | 2/1984 | Matthews | 356/350 |
| 4,442,350 | 4/1984 | Rashleigh | 250/227 |

OTHER PUBLICATIONS

Davis et al., Techniques for Shot Noise Limited Inertial Rotation Measurement Using a Multiturn Fiber Sagnac Interferometer, SPIE 161 157, 1978, p. 131, Laser Inertial Rotation Sensors.
Goss et al., "Fiber-Optic Rotation Sensor Technology" from Applied Optics, vol. 19, No. 6, Mar. 15, 1980, pp. 852–858.
Merz et al., "GaAs Integrated Optical Circuits by Wet Chemical Etching" from IEEE Journal of Quantum Electronics, vol. OE-15, No. 2, Feb. 1979, pp. 72–82.
Garmire, "Optical Waveguide for Laser Gyro Applications" from SPIE vol. 157, Laser Inertial Rotation Sensors, 1978, pp. 95–99.
Leonberger et al., "Low-Loss GaAs p+n−n+Three-Dimensional Optical Waveguides" from Applied Physics Letters, vol. 28, No. 10, May 15, 1976, pp. 616–619.
Anderson, "Integrated Optical Spectrum Analyzer: An Imminent 'Chip'", IEEE Spectrum, Dec. 1974, pp. 22–29.

Primary Examiner—David C. Nelms
Assistant Examiner—J. Jon Brophy
Attorney, Agent, or Firm—Anthony T. Lane; Robert P. Gibson; Freddie M. Bush

[57] ABSTRACT

A transducer utilizes a laser source, photoelastic waveguides, two optical beam paths and a detector for processing optical energy from the laser through a stress transfer medium and thereby detects stress forces present on the transducer. This allows forces such as pressure, strain, voltage, or current to be detected and converted from one form to another for measurement of the force and response thereto. Input forces are detected as optical frequency shifts and converted to electrical signal outputs for indicating circuitry. In an integrated optic format, the transducer package volume is small, allowing ready use in guidance or navigation systems. Light generated by the laser travels along two paths, is optically stressed by the force transfer member and is combined with a reference signal to obtain the stress intelligence.

6 Claims, 4 Drawing Figures

INTEGRATED OPTICS TRANSDUCER

DEDICATORY CLAUSE

The invention described herein may be manufactured, used, and licensed by or for the Government for governmental purposes without the payment to me of any royalties thereon.

CROSS-REFERENCE TO RELATED APPLICATION

This application is a division of applicant's copending application Ser. No. 371,867, filed Apr. 26, 1982, which issued June 12, 1984 as U.S. Pat. No. 4,454,418.

SUMMARY OF THE INVENTION

An integrated optics transducer circuit for phase detection produces an output beam that is modified in proportion to a change in magnitude of input stress energy such as from pressure, strain, voltage, or current. For phase detection a reference input beam has the intensity divided and coupled into two waveguides. One waveguide is subjected to stress, the other is unstressed. The beams pass through the waveguides, are recombined, and are detected by a photodetector which provides an electrical output indicative of any phase difference between the beams passing through the two waveguides. The phase difference is proportional to a change in stress input.

DESCRIPTION OF THE PREFERRED EMBODIMENT

Generally an output laser beam is phase modified and detected by a detector in proportion to the change in magnitude of the input forces, pressure, strain, voltage or current. For phase detection the beam is split, a first part of the beam being directed along a first path toward a detector, and a second part of the beam being directed along a second path toward the same detector. One beam passes through an unstressed photoelectric electro-optic waveguide and the other beam passes through a stressed photoelastic electro-optic waveguide. The phase difference between the stressed and unstressed waveguides is proportional to a change in input. The two beams exit the waveguides and are coupled to the detector where an interference condition is established.

Figure 1:
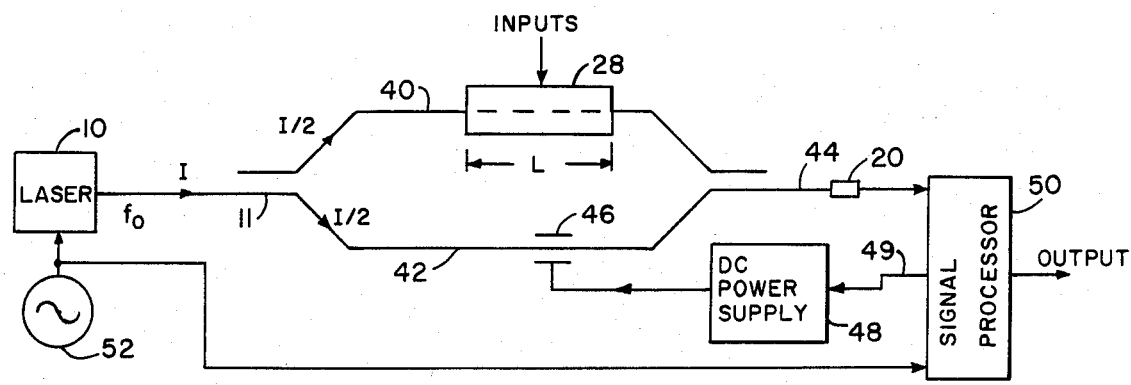
FIG. 1 is a diagrammatic view of the phase detection transducer using integrated optics and electronics.

Referring now to the drawings wherein like numbers represent like parts, a phase detection transducer is shown in FIG. 1. A laser source 10, input waveguide 11, a signal waveguide 40, reference waveguide 42 and an output waveguide 44 comprises the optical circuitry. A photodetector 20 and signal processor 50 comprise the electrical circuitry. Output signals from the signal processor may be coupled to any monitoring system such as a visual display or a computer. The transducer can be operated in an open or closed loop mode where the signal processor is typically a demodulator with an output proportional to the phase difference between the beams.

A stress transfer element 28, as shown in FIGS. 1 and 2A–2C, is mounted on electro-optical waveguide 40 and responds to forces such as pressure, strain, voltage or current to stress the waveguide. Substrate 26, which contains the waveguides and other optical circuit portions therein, may be a gallium arsenide or other similar material used in integrated optic systems. Transfer element 28 is disposed for transferring forces to waveguide 40 that are unidirectional to the plane of travel of laser light within the waveguide.

Figure 2A:
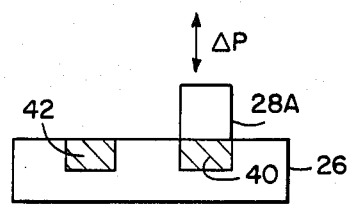
FIGS. 2A, 2B, and 2C are diagrammatic cross-sectional views of the waveguide assembly, showing various stress or force transfer members coupled to the waveguide.

In the diagrammatic view of FIG. 2A waveguides 40 and 42 are shown formed in substrate 26 and stress transfer element 28A is fixedly attached to the surface of waveguide 40 for applying pressure forces normal thereto. Pressure or force $\Delta p$ is applied only to waveguide 40 and normal to the surface of the substrate. Thus, element 28A applies force normal to the plane of travel of laser light within waveguide 40.

Figure 2B:
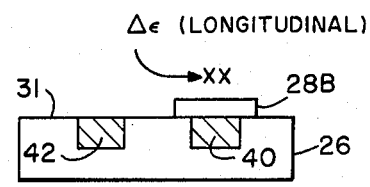

FIG. 2B discloses stress transfer element 28B to be disposed across a portion of the surface 31 of substrate 26 covering and including part of the waveguide 40 surface for measuring strain, strain forces $\Delta\epsilon$ being applied in a plane parallel with the plane of surface 31 of substrate 26 and parallel to the plane of waveguide 40. Strain forces are shown typically as symbolized by the x's above transfer element 28B. The x's represent strain forces applied to element 28B and directed normally into the paper along the length of the element since this allows maximum strain signal transfer along the length of the waveguide 40. Transverse forces or forces at an angle will be sensed in the waveguide but maximum sensitivities occurs when forces are oriented longitudinally.

Figure 2C:
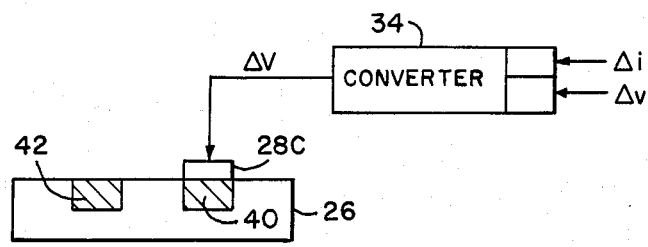

FIG. 2C discloses a transfer element or stress producing member 28C such as an electro-optic element attached to waveguide 40, which receives a voltage input $\Delta V$ from a converter 34 and responds with a mechanical force output, stressing waveguided 40. Converter 34 may be a current-to-voltage converter or a voltage-to-voltage-converter for responding to the desired input $\Delta i$ or $\Delta v$ to provide the representative $\Delta V$ output.

The externally applied energy in the form of pressure, strain, current, or voltage forces stresses waveguide 40 in compression or tension depending on the direction of the forces, and thereby changes the optical path length of the waveguide.

In open-loop operation of the integrated optics transducer structure of FIG. 1, the laser beam is coupled between adjacent waveguides 40 and 42 using waveguide-to-waveguide directional coupling (W-W-DC) methods as is well known in the art. The horizontally polarized laser beam from source 10 has an output frequency $f_0$ polarized perpendicular to the direction of stress forces on waveguide 40. The laser beam has intensity I which travels in input waveguide 11 prior to being split via W-W-DC into two beams with intensity $I/2$. One beam travels in the signal waveguide 40 which is subject to input forces from stress transfer element 28 that stresses the waveguide, changing its optical path length (OPL). The other beam continues to travel in the reference waveguide 42 and passes through an electro-optic phase bias element 46. The bias voltage for element 46 is supplied by power supply 48, providing a 90° phase lag between the two beams when there is no input stress. The detection of small stresses in waveguide 40 are more easily detected because the beams are separated by 90°, which is the maximum slope point. The two beams are added in waveguide 44 and the resulting interference signal is detected by detector 20. The output of detector 20 is coupled to a signal processor or demodulator 50 where the transducer output is developed.

In closed-loop operation, the signal processor 50 generates a feedback signal 49 to the D.C. power supply 48 which produces a voltage to the phase modulator 46 that maintains a 90° separation between beams. In this case the voltage change coupled to the phase modulator 46 is proportional to the input stress of waveguide 40. In this mode of operation Equation (10) still applies but a null will be maintained at $\Delta\phi$ equal zero so that a change in laser intensity I will not affect the accuracy of the measurement. In applications where this feedback is not desired the transducer is operated in an open-loop mode by simply omitting feedback signal 49 and $\Delta\phi$ is not equal to zero.

Output signals from processor 50 may be coupled to any monitoring system such as a visual display or a computer. The laser modulator 52 drives laser 10 and also provides a reference signal to processor 50, providing detector shot-noise-limited operation.

With a stress input applied through members 28 (28A, 28B, or 28C) to the wavesguide, the index of refraction of the waveguide is changed, generating a phase change in beam intensity output coupled from waveguide 40 to waveguide 44. This phase changed output combines with the unchanged beam intensity passed through waveguide 42 to provide interference fringes indicative of the amount of phase shift, which is itself indicative of the degree of stress input.

For the structure of FIG. 1, the stress transfer element 28 is similar to the particular stress transfer elements shown in FIGS. 2A–2C of applicant's U.S. Pat. No. 4,454,418, issued June 12, 1984, depending on the particular stress being measured. The primary difference is that, in the phase detection transducer, stress is applied to only one portion of the waveguide 40 and that is substantially along a straight line. Alternatively, in the disclosure of U.S. Pat. No. 4,454,418, the stress transfer members are circular, covering the entire surface over the resonator 16.

The phase change $\Delta\phi$ between the beams can be derived as follows:

$$\Delta\phi = \Delta n L/\lambda \tag{1}$$

wherein $\Delta n$ is the change in index of refraction caused by stress, L is the length of waveguide being stressed, and $\lambda$ is the wavelength of the laser beam. To measure pressure:

$$\Delta n = B\Delta P \tag{2}$$

where B is the waveguide photoelastic constant in Brewsters ($10^{-13}$ cm$^2$/dyne) and $\Delta P$ is the change in pressure (dyne/cm$^2$). Using equations (1) and (2):

$$\Delta\phi = B\Delta PL/\lambda \tag{3}$$

To measure strain:

$$\Delta n = BE/\Delta\epsilon, \tag{4}$$

where E is the waveguide modulus of elasticity (dyne/cm$^2$) and $\Delta\epsilon$ is a change in unit strain (cm/cm). Using equations (1) and (4):

$$\Delta\phi = BEL\Delta\epsilon/\lambda \tag{5}$$

To measure voltage (v) or current (i), the change in index $\Delta n$ is as follows:

$$\Delta n = K_1 \Delta V \text{ for current, and} \tag{6}$$

$$\Delta n = K_2 \Delta V \text{ for voltage,} \tag{7}$$

where $K_1$ and $K_2$ are constants which are a function of the converter and the electro-optic transfer material ($\Delta n/\Delta V$). From equation (1):

$$\Delta\phi = KVL/\lambda, \text{ where K is either } K_1 \text{ or } K_2. \tag{8}$$

The equations for beam intensity at the detector are:

$$I_o = I(1 + \cos \Delta\phi) \tag{9}$$

where
$I_o$ = intensity at detector and
$I$ = laser beam intensity.
For a 90° phase lag:

$$I_o = I[1 + (\cos \phi - 90°)] = I(1 + \sin \Delta\phi). \tag{10}$$

The primary goal of integrated optics is to integrate a variety of discrete optical elements, both active and passive, into a monolithic, miniaturized planar structure. It is an optical analogy of integrated circuit technology in the electronics industries. By this analogy, it is reasonable to assume that optical systems in the integrated optics configuration can be made more efficient, compact and stable at lower cost. In the embodiment shown, which is a monolithic structure, gallium-arsenide is used as the substrate. Other substrates may be resorted to such as silicon, lithium-niobate, or fiber optic waveguides however, in these structures an interface must be used between the laser and the substrate and the detector.

Obviously many modifications and variations of the present invention are possible in the light of the above teachings. It is therefore to be understood that within the scope of the appended claims the invention may be practiced otherwise than as specifically described.

I claim:

1. A transducer comprising: a laser for generating a beam of coherent light, a photodetector, photoelastic waveguide means disposed between said laser and said photodetector for providing first and second optical paths therebetween, said photodetector being aligned for detecting light passing through said first and second optical paths, stress transfer means disposed adjacent said waveguide means for subjecting said first path to stress forces, said second optical path being unstressed, signal processing means adapted to receive an input from said photodetector for providing a signal output in response to stress forces on said stress transfer means, and a laser modulator for driving said laser at a particular frequency rate and for providing said driving rate to said signal processing means as a reference signal, said laser, waveguide, and photodetector being aligned for directing said light within a plane from said laser to said photodetector, and wherein said photoelastic waveguide means comprises an input waveguide, an output waveguide, and first and second adjacent waveguides for providing said first and second optical paths, said waveguide being coupled between the input and output waveguides for providing waveguide-to-waveguide directional coupling between said input waveguide and said first and second waveguides, and providing said directional coupling between said first and second waveguides and said output waveguide, said input waveguide being disposed for receiving the light output from said laser, and said output waveguide being disposed for coupling light passed through said first and second waveguides to said photodetectors; and wherein said waveguide means is planar for providing a plane of travel for laser light, said waveguide means, said laser, and said photodetector are a monolithic substrate of integrated optics.

2. A transducer as set forth in claim 1 wherein said stress transfer means is disposed for applying forces to said first optical path that are parallel to the plane of said waveguide means.

3. A transducer as set forth in claim 1 wherein said stress transfer means comprise an electro-mechanical stress producing member and an electrical signal converter for converting electrical input signals to an incremental, variable voltage output, said stress producing member being responsive to said voltage output for providing a mechanical force to said first waveguide for stressing said first waveguide.

4. An integrated optics transducer comprising: a laser for generating an output coherent light beam; a photodetector having an input and an output; photoelastic waveguide means having an input, an output, and first and second separate optical paths therebetween; said waveguide means having the input coupled to receive said laser beam output and having the output coupled to said photodetector input; said photodetector providing an electrical signal output indicative of and in response to light input received from said waveguide means; stress transfer means disposed adjacent said photoelastic waveguide means for subjecting a portion of the waveguide means to stress forces for affecting a portion of light energy passing therethrough; said waveguide means being planar and providing a plane of travel for light energy, and wherein said laser, said photodetector and said photoelastic waveguide means are an integrated optics structure.

5. An integrated optics transducer as set forth in claim 4 wherein said photoelastic waveguide means has an input optical waveguide that functions as said input, an output optical waveguide that functions as said output, and first and second adjacent optical waveguides coupled between the input and output waveguides and functioning as said first and second optical paths between said input and output for dividing input light signals substantially equally between said first and second waveguides and for bringing said divided light signals back together at said output waveguide for coupling to said photodetector input; and said stress transfer means being disposed for subjecting only said first optical waveguide to said stress forces in response to stress forces on said stress transfer means, said second optical waveguide being unstressed.

6. An integrated optics transducer as set forth in claim 5 wherein said stress transfer means is disposed for transferring forces to said first optical waveguide that are normal to the plane of travel of laser light within said waveguide means; and wherein said integrated optics structure is a monolithic substrate.

* * * * *